Patented Mar. 6, 1951

2,544,141

UNITED STATES PATENT OFFICE 2,544,141

WEED CONTROL

John J. Donleavy, Montclair, N. J., assignor to Allied Chemical & Dye Corporation, a corporation of New York No Drawing. Application May 28, 1946, Serial No. 672,911

8 Claims. (Cl. 71—2.2)

This invention relates to methods for combatting undesired vegetation and in particular to methods suitable for the control of monocotyledonous weeds such as Bermuda and Johnson grasses which are particularly pernicious in the South.

The prior art discloses various types of herbicides each of which is more or less suited to the control of a particular weed or group of weeds. Some herbicides are best adapted for control of weeds in agricultural lands where damage to crops must be avoided and residual or long lasting weed killing effect is not an objective. In other cases, it may be desired merely to kill the top growth, and not injure the roots of the vegetation or create sustained herbicidal properties in the soil. Arsenic compositions are characterized by relatively low root kill. The chlorates, bichromates and carbon bisulfide compositions have the disadvantage of fire hazard, inability to kill deep roots, and temporary effect. Various oil emulsions are inconvenient to prepare and in some instances difficult to spray. The sulfamates are selective with respect to poison ivy but offer no special advantage for combatting other types of weeds. The polychlorophenol herbicides do not appear to be sufficiently effective in the destruction of the monocotyledonous weeds.

The purpose of this invention is to provide methods for combatting weeds by means of herbicides which have a moderately rapid initial action and more particularly a long lasting weed killing effect, kill weed roots at substantial depth below the surface of the ground, inhibit the regrowth of weed seedlings, and which are especially effective in combatting monocotyledonous weeds such as Bermuda and Johnson grasses.

I have found that the objectives of the invention may be accomplished by subjecting weeds and undesirable vegetation to the action of fluoboric acid or the salts thereof, particularly the inorganic salts of fluoboric acid such as the salts of heavy metals, alkali metals and ammonia, and the invention includes the discovery of the herbicidal properties of these substances. Representative examples of materials which are particularly effective for purposes described are iron fluoborate, copper fluoborate, fluoboric acid, sodium fluoborate and ammonium fluoborate. In the better practice of the invention, the herbicides employed are inorganic fluoborates of heavy metals such as copper, iron and zinc, the preferred treating materials being iron fluoborate, and copper fluoborate. The herbicides of the invention kill weeds at substantial depth below the earth's surface, inhibit regrowth of weed seedlings, and are particularly characterized by cumulative phytotoxic action. Although the action of such herbicides is especially applicable to control of monocotyledonous weeds such as Bermuda and Johnson grasses, the materials described are likewise well suited for the destruction and control of less refractory varieties of weeds some of which are described herein.

All of the foregoing weed killers are water soluble, and hence readily adaptable for use in the form of aqueous spray solutions. The herbicides utilized in accordance with the invention may be applied to the vegetation or weeds to be controlled in any manner, either dry or in solutions of concentrations suitable for particular local conditions. In general practice of the invention, the herbicides thereof are applied as aqueous spray solutions comprising 2–11% by weight of the particular fluoboro material or mixtures thereof which is being used. The iron and copper fluoborates are preferably employed in aqueous spray solutions containing from 3% to 8% by weight of such materials.

Following are examples of practice of the invention:

EXAMPLE 1

Growth on plots: 97% Bermuda grass, 1% watergrass, 2% annuals

Treatment: 6% by weight water solution of copper fluoborate (400 pounds per acre dry basis)

Inspection 15 days after treatment

Watergrass:
  Top kill—100%
  Root kill—100%
  Root condition—dry, brown

Bermuda grass:
  Color change—faded gray-olive, brittle
  Top kill—99%
  Stem sprout—none
  Root sprout—arrested and dry
  Bulb sprout—arrested, somewhat woody
  Root condition—entire root system drying out; woody

Inspection 3 months, 20 days after treatment

Old top growth living—less than 1%
Barren surface—95%
Root growth killed—97% of Bermuda
Depth of root kill—complete in barren spots
New root growth compared with untreated weeds—3%
New seedlings of any kind—6 ragweeds Growth existing based on total original weeds—4%

EXAMPLE 2

Growth on plot: 98% Bermuda grass, 2% annuals
Treatment: 10% by weight water solution of copper fluoborate (670 pounds per acre dry basis)

*Inspection 15 days after treatment*

Bermuda grass:
    Color change—faded gray-olive
    Top kill—100%
    Stem sprout—none
    Root sprout—none
    Bulb sprout—1 in 20 plants
    Root condition—woody and drying out

*Inspection 3 months, 20 days after treatment*

Old top growth living—less than 1%
Barren surface—94%
Root growth killed—96% of Bermuda
Depth of root kill—complete in barren spots
New root growth compared with untreated weeds—4% (Bermuda)
New seedlings of any kind—15-20 ragweeds
Growth existing based on original—4%

EXAMPLE 3

Growth on plot: 90% Bermuda, 6% watergrass, 2% wire grass, 2% annuals
Treatment: 3.8% by weight water solution of iron fluoborate (250 pounds per acre dry basis)

*Inspection 15 days after treatment*

Watergrass:
    Top kill—none
    Root kill—none
    Root condition—no change
Bermuda grass:
    Color change—black-green to straw color
    Top kill—50%
    Stem sprout—none; some leaves wilted
    Root sprout—normal
    Bulb sprout—normal
    Root condition—normal
Wire grass: not killed

*Inspection 3 months, 20 days after treatment*

Old top growth living: less than 5% of Bermuda, 1 clump of wire grass, 1 watergrass
Barren surface—80%
Root growth killed—85%+ of Bermuda
Depth of root kill—complete in barren spots
New root growth compared with untreated weeds 10-15%
New seedlings of any kind—ragweed and several miscellaneous annuals
Growth existing based on original—15%

EXAMPLE 4

Growth on plot: 93% Bermuda grass, 5% watergrass, 2% annuals
Treatment: 4% by weight water solution of copper fluoborate (266 pounds per acre dry basis)

*Inspection 15 days after treatment*

Watergrass:
    Top kill—100%
    Root kill—100%
    Root condition—decomposing

Bermuda grass:
    Color change—straw color with green-olive tint
    Top kill—100%
    Stem sprout—few necrotic
    Root sprout—few necrotic
    Root condition—woody; brown discolorations

EXAMPLE 5

Growth on plot: 90% Bermuda grass, 8% watergrass, 2% annuals
Treatment: 2.3% by weight water solution of fluoboric acid (198 pounds per acre dry basis)

*Inspection 15 days after treatment*

Watergrass:
    Top kill—100%
    Root kill—100%
    Root condition—dried
Bermuda grass:
    Color change—unbleached linen, brownish tint
    Top kill—100%
    Stem sprout—1% terminal blades
    Root sprout—bleached 2½ inches underground, including nodes
    Bulb sprout—4 on 10 plants 50% necrotic
    Root condition—dormant, suppressed and bleached

EXAMPLE 6

Area treated: tie section and adjoining lateral areas to grass line on a railroad track in South Carolina.
Growth on area treated: dense vegetation of Johnson grass, briars and shrubs up to 5 feet high, a dense mat of Bermuda grass, cow itch (trumpet vine), saw briar, fennel, milkweed, and many other forms of miscellaneous grasses.
Weather conditions: hot, sunshine, 90° F., soil dry at the time of treatment. A heavy thundershower occurred 1 hour after treatment.
Treatment: 6¼% by weight water solution of iron fluoborate, (570 gal. per mile).
Results; inspection made 13 days after treatment: All varieties of reported weeds were killed, except Johnson grass and trumpet vine, the latter two being killed from approximately 50% to 90%. The color of the vegetation was uniformly a jet black. Regrowth of Johnson grass: unhealthy yellow green wilting sprouts from 2 to 5 inches in length. Regrowth of trumpet vine: sprouts 2 to 3 inches long. Root kill: complete for other weeds including Bermuda.

EXAMPLE 7

Weed growth on the test plot consisted principally of Pará grass (Panicum), and growing conditions during the entire test were excellent. Treatment consisted of dusting with dry sodium fluoborate in quantity equivalent to 1000 pounds per acre. Results obtained were as follows:

| Days after treatment | Per cent kill |
|---|---|
| 4 | 40 |
| 16 | 40 |
| 54 | 95 |

EXAMPLE 8

Weed growth, weather and other conditions were the same as in Example 7. Treatment per acre consisted in the use of a spray solution of 400 pounds of sodium fluoborate dissolved in 400 gallons of water, i. e. a water solution containing 10.7% by weight of sodium fluoborate. Results obtained were:

| Days after treatment | Per cent kill |
|---|---|
| 4 | 35 |
| 16 | 40 |
| 54 | 95 |

EXAMPLE 9

In this test, weed growth comprised chiefly Pará and Bermuda grass. Growing conditions were excellent. Treatment per acre consisted in the use of a spray solution of 400 pounds of copper fluoborate dissolved in 400 gallons of water, i. e. a water solution containing 10.7% by weight of copper fluoborate. Results obtained were as follows:

| Days after treatment | Per cent kill | |
|---|---|---|
| | Para grass | Bermuda grass |
| 9 | 95 | 100 |
| 28 | 90 | 95 |

The test work of Examples 1–5 and 7–9 was conducted in Florida. Applications of the herbicides and observations of the results obtained were made as indicated. Prior to the time of the tests, weed growth on the various plots had not been disturbed for three years so that all vegetation was deep rooted and therefore relatively difficult to destroy. Examples 1 and 2 illustrate the relatively immediate and particularly the long lasting herbicidal properties of copper fluoborate. Example 4 shows the rapid action of this material when used in relatively low concentrations. In Example 3, an iron fluoborate solution of relatively low concentration was used. This test and also the tests of Examples 7 and 8 show a marked characteristic of some of the metal fluoborate salts, i. e. that under some conditions of host and weather while results as to kill may not be immediate, the herbicidal effect is cumulative and increases with passage of time. Example 5 illustrates the rapid action of fluoboric acid spray solution even when used in relatively low concentrations. From Example 6, it is noted that the iron fluoborate spray solution is effective not only in the case of the Johnson grass but also with the trumpet vine, saw briar, fennel, milkweed, briars, shrubs, Bermuda grass and many other forms of miscellaneous grasses. Further, Example 6 demonstrates the quick penetrating properties, because the results indicated were obtained notwithstanding a heavy thundershower which took place about an hour after spraying.

The fluoborate herbicides of the invention are compatible with other herbicides such as sulfuric acid, arsenic compounds, polychlorophenols, petroleum oil emulsions, etc. and it may be desired to incorporate some of these other specific herbicides to obtain varied and particular effects.

I claim:

1. The method of combatting weeds which comprises treating said weeds with an aqueous solution, comprising 2 to 11% by weight of material of the group consisting of fluoboric acid and the salts thereof, in amount sufficient to cause deterioration of said weeds.

2. The method of combatting weeds which comprises treating said weeds with an aqueous solution, comprising 2 to 11% by weight of an inorganic heavy metal salt of fluoboric acid, in amount sufficient to cause deterioration of said weeds.

3. The method of combatting weeds which comprises treating said weeds with an aqueous solution, comprising 2 to 11% by weight of iron fluoborate, in amount sufficient to cause deterioration of said weeds.

4. The method of combatting weeds which comprises treating said weeds with an aqueous solution, comprising 2 to 11% by weight of copper fluoborate, in amount sufficient to cause deterioration of said weeds.

5. The method of combatting weeds which comprises treating said weeds with an aqueous solution, comprising 2 to 11% by weight of fluoboric acid, in amount sufficient to cause deterioration of said weeds.

6. The method of combatting weeds which comprises treating said weeds with an aqueous solution, comprising 3–8% by weight of iron fluoborate, in amount sufficient to cause deterioration of said weeds.

7. The method of combatting weeds which comprises treating said weeds with an aqueous solution, comprising 3–8% by weight of copper fluoborate, in amount sufficient to cause deterioration of said weeds.

8. The method of combatting weeds which comprises treating said weeds with an aqueous solution comprising 2 to 11% by weight of sodium fluoborate, in amount sufficient to cause deterioration of said weeds.

JOHN J. DONLEAVY.

REFERENCES CITED

The following references are of record in the file of this patent:

FOREIGN PATENTS

| Number | Country | Date |
|---|---|---|
| 10,450 | Great Britain | 1905 |
| 19,418 | Great Britain | of 1895 |
| 595,010 | France | Sept. 25, 1925 |

OTHER REFERENCES

Thorpe: A Dictionary of Applied Chemistry (1921), vol. VII, pages 455 and 456.

Bourcart: Insecticides, Fungicides and Weed Killers, 2nd edition (1925), page 184.